(12) United States Patent
Gottlieb

(10) Patent No.: US 6,446,118 B1
(45) Date of Patent: Sep. 3, 2002

(54) E-MAIL NOTIFICATION DEVICE

(75) Inventor: Mark M. Gottlieb, Fairfax Station, VA (US)

(73) Assignee: Designtech International, Inc., Springfield, VA (US)

( * ) Notice: Subject to any disclaimer, the term of this patent is extended or adjusted under 35 U.S.C. 154(b) by 0 days.

(21) Appl. No.: 09/453,887

(22) Filed: Feb. 29, 2000

(51) Int. Cl.$^7$ ............................................... G06F 15/16
(52) U.S. Cl. ..................... 709/217; 709/218; 709/219; 709/206; 709/205
(58) Field of Search ............................... 709/206, 217, 709/218, 219, 205, 248

(56) References Cited

U.S. PATENT DOCUMENTS

| | | | |
|---|---|---|---|
| 5,043,721 A | | 8/1991 | May .......................... 340/7.54 |
| 5,493,692 A | * | 2/1996 | Theimer et al. ............ 455/126 |
| 5,561,703 A | | 10/1996 | Arledge et al. .......... 340/7.201 |
| 5,754,778 A | * | 5/1998 | Shoujima ..................... 709/206 |
| 5,781,857 A | * | 7/1998 | Hwang et al. ................. 45/412 |
| 5,926,624 A | * | 7/1999 | Katz et al. ................... 709/217 |
| 5,944,786 A | * | 8/1999 | Quinn .......................... 706/206 |
| 6,034,621 A | * | 3/2000 | Kaufman ............... 340/825.44 |
| 6,038,542 A | * | 3/2000 | Ruckdashel ..................... 705/9 |
| 6,044,395 A | * | 3/2000 | Costales et al. ............. 709/206 |
| 6,049,291 A | * | 4/2000 | Kikinis ........................ 340/825 |
| 6,061,718 A | * | 5/2000 | Nelson ........................ 709/206 |
| 6,067,561 A | * | 5/2000 | Dillon ......................... 709/206 |
| 6,118,856 A | * | 9/2000 | Paarsmarkt et al. ..... 379/93.24 |
| 6,219,694 B1 | * | 4/2001 | Iazaridis et al. ............. 709/206 |
| 6,219,696 B1 | * | 4/2001 | Wynblatt et al. ............ 709/218 |
| 6,255,800 B1 | * | 7/2001 | Bork .......................... 320/115 |

OTHER PUBLICATIONS http://www.mailbug.com/pages/products.html, "Mailbug: Real Email Without a Computer!", printed Jun. 14, 2000, date of publication of reference unknown, pp. 1–2.

http://www.mailbug.com/pages/services.html, "Email Service Information", printed Jun. 14, 2000, date of publication of reference unknown, p. 1.

http://www.mailbug.com/pages/reviews.html, "What the Critics Are Saying About Mailbug", printed Jun. 14, 2000, date of publication of reference unknown, pp. 1–3.

http://www.mailbug.com/pages/mailbugspec.html, "MailBug: Detailed Specification", printed Jun. 14, 2000, date of publication of reference unknown, pp. 1–2.

http://www.mailbug.com/pages/support.html, "Frequently Asked Questions", printed Jun. 14, 2000, date of publication of reference unknown, pp. 1–8.

http://www.mailbug.com/pages/mailbugimage.html, printed Jun. 14, 2000, date of publication of reference unknown, p. 1.

* cited by examiner

*Primary Examiner*—Dung C. Dinh
*Assistant Examiner*—Abdullahi E. Salad
(74) *Attorney, Agent, or Firm*—Oblon, Spivak, McClelland, Maier & Neustadt, P.C.

(57) ABSTRACT

A method, system and computer program product for notifying a user of recently received information while away from the display connected to the computer. Using a non-commercial, private network, the information is forwarded from a computer through a transmitter to a portable receiver with an integrated display. Such information may be in the form of e-mails, stock quotes, and calendar alarms.

13 Claims, 3 Drawing Sheets

E-MAIL NOTIFICATION DEVICE

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art

With the proliferation of less expensive computers and connection costs, an increasing number of people are staying connected through e-mail. Several Internet standards cover various techniques for sending, receiving, and forwarding e-mails. Two such techniques are the Simple Mail Transfer Protocol (SMTP) and the Post Office Protocol (POP). Those techniques are described in (1) STD0010 and (2) STD0053, RFC 1939, RFC1957, and RFC2449, respectively, available at http://www.ietf.org/rfc.html. The contents of those STDs and RFCs are incorporated herein by reference.

Although e-mail communications are effectively delivered in an office environment where a user is often at his/her desk, e-mail communication is less effective for users at home since a user may be in a different part of the house than the computer. Accordingly, users frequently go back to their machine to check if an awaited e-mail has arrived yet. This may result in wasted trips to the computer and increased anxiety over whether the e-mail has been received.

Some users have turned to wireless communication services to forward e-mails to them when they are not near their computers. One such communication service uses two-way pagers and the SkyWriter paging service from SkyTel, a division of MCI WorldCom Company. (Details of the SkyWriter service can be found at www.skytel.com.) Although a user's e-mail can be sent to the pager using the SkyWriter service, one significant drawback is that the service is provided in exchange for a monthly fee. Such a network supporting such a fee-based service for multiple members of the public will be referred to hereinafter as a "commercial, public network."

2. Field of the Invention

The present invention is directed to a method, system and computer program product for notifying a user of recently received e-mails while away from the display connected to the computer.

BRIEF SUMMARY OF THE INVENTION

It is an object of the present invention to provide a wireless e-mail delivery system that does not require a commercial, public network.

This object, and other advantages, are provided by a system, method and computer program product for forwarding e-mail headers from a private computer to an e-mail notification device.

BRIEF DESCRIPTION OF THE SEVERAL VIEWS OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
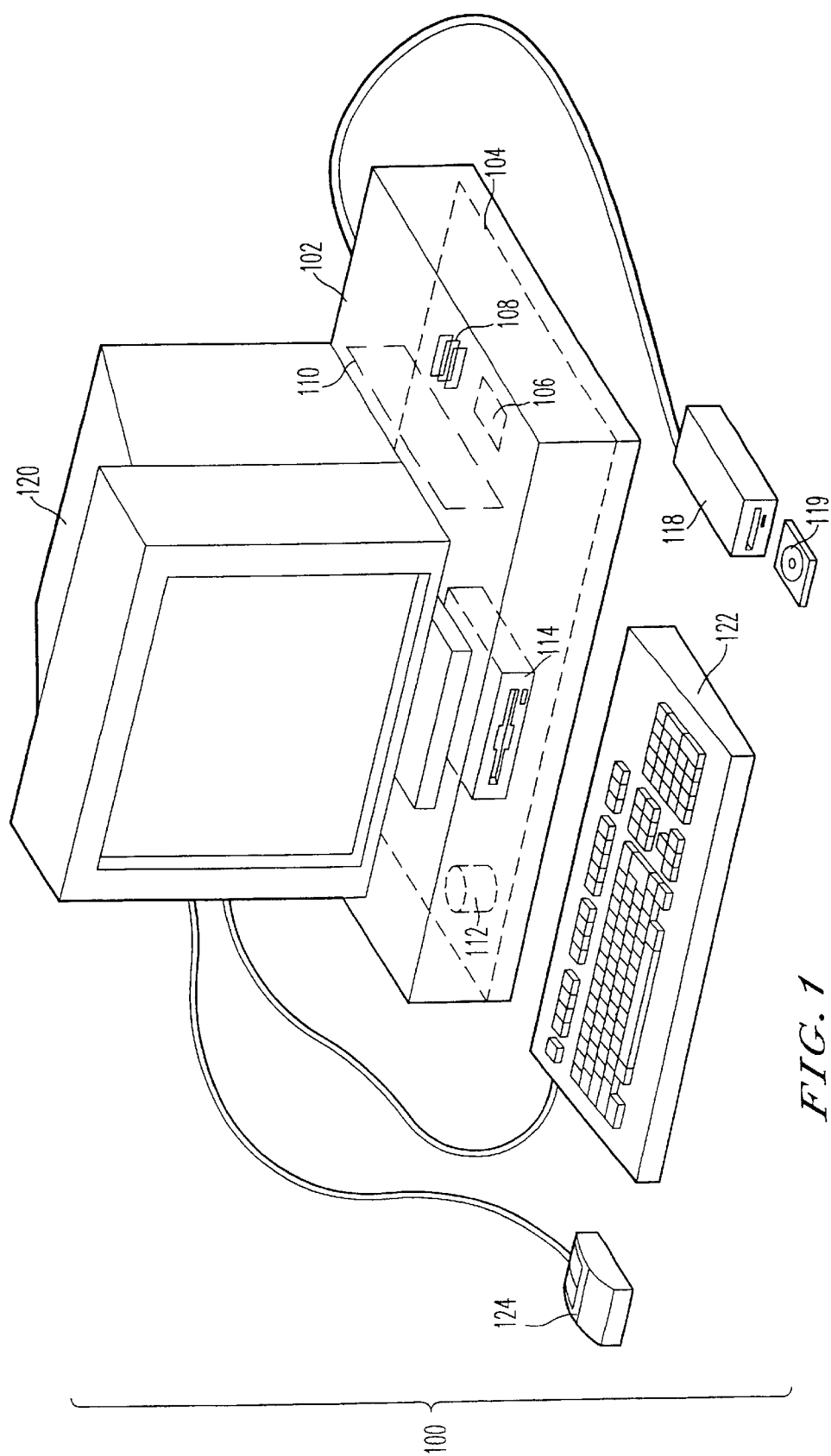
FIG. 1 is a schematic illustration of a computer for receiving e-mail to be forwarded to an e-mail notification device.

Referring now to the drawings, wherein like reference numerals designate identical or corresponding parts throughout the several views, FIG. 1 is a schematic illustration of a computer system for forwarding e-mail messages. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of e-mail messages stored on the computer 100 that may be forwarded to an e-mail notification device (shown in FIG. 2).

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for forwarding e-mail messages. The computer code devices of the present invention can be any interpreted or executable code mechanism, including but not limited to scripts, interpreters, dynamic link libraries, Java classes, and complete executable programs.

The computer program product of the present invention is configured to periodically connect to a user's e-mail account(s) to determine if new e-mail messages have arrived since a last time that the computer 100 checked. The period between checks can be established through a textual interface, through a graphical interface, or using configuration files. In a preferred embodiment, the e-mail account is checked regularly (e.g., <30 minutes). In one embodiment, the computer 100 seizes a phone line, creates a dial-up connection, and terminates a dial-up connection after the computer code devices have downloaded the desired information. (Clearly other connection methods are also possible.) Using this regular checking provides two advantages. The first advantage is that the phone line used to call out (and in) is not tied-up continuously checking for new messages. (For pay-based networks, this provides the added result that costs are reduced.) The second advantage is that some systems (e.g., AOL) automatically disconnect users after a certain amount of inactivity. Thus, the present invention can reconnect even if disconnected.

In one embodiment of the present invention, the computer 100 establishes one of a SLIP or a PPP connection through a dial-up adapter (e.g., a modem) to provide the underlying communication capabilities. Such a dial-up connection may be made using either a land-based phone or a cellular phone. In an alternate embodiment, an "always on" communication channel replaces the dial-up connection. Examples of an "always on" connection are cable modems and LAN adapters (e.g., token ring or Ethernet), and typically communications thereon utilize the Transmission Control Protocol over the Internet Protocol (TCP/IP).

Once the underlying communication capabilities have been established, the computer 100 connects to a remote mail server (e.g., using TCP/IP sockets to connect to a a corresponding port on the remote mail server). Then, the remote mail server is polled for new e-mail messages according to the protocol(s) supported by the server. As with the polling period, which server(s) to poll (and in what order if there are multiple servers) can be established through a textual interface, through a graphical interface, or using configuration files. Those servers can be identified by IP address or name, and the corresponding port can be defined implicitly based on a specified protocol type (e.g., POP or IMAP) or explicitly. In addition, for each of the servers, an account name to use on that server is also specified (along with a corresponding password, if required).

Having connected and performed any required authentication, the computer 100 may begin processing of the messages in the user's mailbox. In one embodiment, the computer 100 tracks which messages in the user's mailbox are new. The computer 100 queries the mail server to determine the number of messages waiting for the user (e.g., using the STAT command in POP3). This number is compared against the last known number of messages waiting for the user. In one embodiment of the present invention, any new messages are downloaded from the remote server to the computer 100 in their entirety. In an alternate embodiment, only a subset of each message is downloaded to the computer. Such an embodiment is beneficial (1) when using low-bandwidth connections and/or (2) when a message is not to be stored on the computer 100, but rather is to remain on the server for later retrieval (potentially at another location). The number of outstanding messages is updated locally at computer 100 according to whether the new messages were downloaded from the server or left for later downloading. In a more robust embodiment, the computer 100 of the present invention also stores other information (e.g., size in octets and/or unique message IDs) about the messages stored at the server to ensure that the computer 100 recognizes when the message state on the server has changed. One scenario where such a change could be missed is when another mail program downloads a message from the server without contacting the computer 100 and a subsequent message is received. In that case, the number of messages would still be correct, but it is unlikely that the size in octets would the same. Moreover, by definition, the unique identifiers of those two messages should also be different.

In an alternate embodiment, the remote server itself tracks which messages are new so that the computer 100 can simply ask for new messages.

A new type of mail server provided by some commercial services (e.g., Hotmail.com) is a web-based e-mail service. The present invention can likewise connect to those types of remote servers using the hypertext transfer protocol (HTTP) to download new e-mail messages.

Once the messages (or parts thereof) have been downloaded to the computer 100, portions thereof are forwarded via a transmitter 200 to an e-mail notification device 220. The transmitter 200 can utilize any one or a combination of (1) RF-based transmission, (2) optical-based transmissions and (3) power-line-based transmissions (e.g., using electrical lines or telephone lines). In a preferred embodiment, however, the transmitter 200 is RF-based. As would be appreciated by one of ordinary skill in the art, the transmitter 200 may be implemented as an adapter internal to the computer 100 or as an external communication device connected to the computer using a serial—(e.g., RS-232 or USB) or parallel-connection. Alternate embodiments include using PS/2 connections, IR links, and/or audio jacks to connect the transmitter 200 to the computer 100. The transmitter 200 performs communication with the e-mail notification device using a "private, non-commercial network." As used hereinafter, a "private, non-commercial network" is defined as a network where (1) the transmitter 200 is dedicated to home or office use for those people having access to the computer 100 and (2) a periodic fee is not paid to a commercial institution for the right to send messages. (The term, however, does not exclude paying a governmental fee for the right to transmit a message, if required.) In one embodiment of the private, non-commercial network, the transmitter 200 is a low-power transmitter with a transmission range of 100 ft. Examples of private, non-commercial frequencies are provided in 47 CFR 15.1 et seq. In a preferred embodiment, the transmitter utilizes a frequency in the range of 300–450 MHz, and preferably 312, MHz, 315 MHz, or 433 MHz, but any frequency is possible. (The contents of section 15 is incorporated herein by reference.) Moreover, the system can use any modulation technique, but super-regenerative and super-heterodyne devices are preferable.

In one embodiment of the present invention, only a message header is forwarded from the computer 100 to the e-mail notification device 220 via the transmitter 200. This reduces the amount of information that must be received, parsed and stored in the e-mail notification device 220. One embodiment of the message header includes the data associated with the "From:" and "Subject:" fields of the message. As would be appreciated by one of ordinary skill in the art, data from additional fields can also be sent in the header as well as other data about the message (e.g., (1) when the message was downloaded to the computer 100 and (2) the size of the message).

Figure 3:
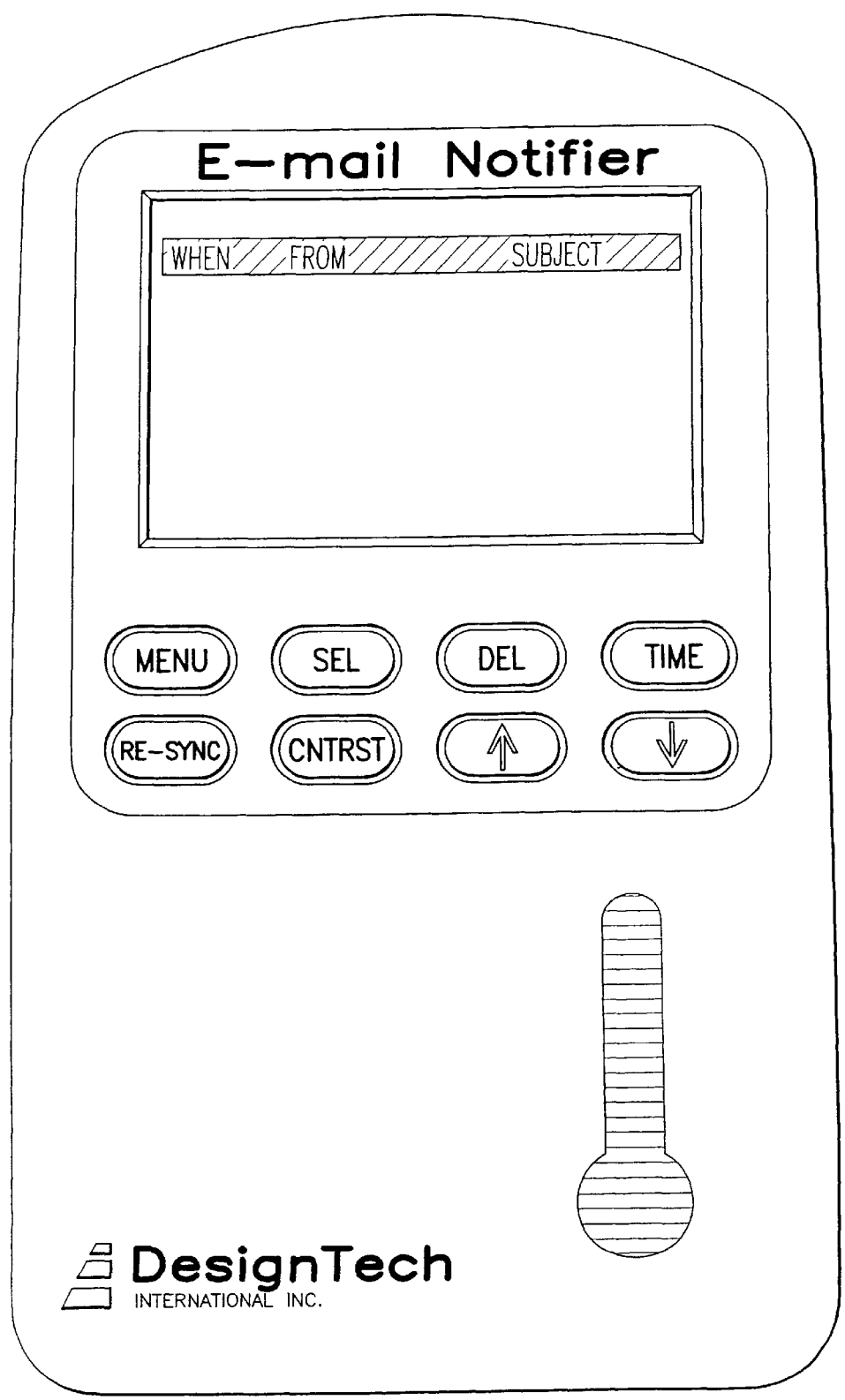
FIG. 3 is an illustrative embodiment of an e-mail notification device of FIG. 2.

As shown in FIG. 3, one embodiment of the e-mail notification device 220 of the present invention displays only three columns (i.e., time received, "From:" and "Subject:") from the header and the other data about the message. Alternate embodiments may include more or fewer columns and/or characters per column.

Various embodiments utilize selected combinations of features described below. As would be appreciated by one of ordinary skill in the art, each of the features described herein can be used independently of the others as memory, processing power, and cost dictate. Accordingly, the illustrated embodiment is only exemplary and is not intended to limit the scope of protection of the claims. Moreover, although buttons are illustrated as providing fixed functionality, it would be appreciated by one of ordinary skill in the art from this disclosure that the various buttons could have functions that change based on the state of the e-mail notification device. Likewise, in a further embodiment, the buttons are replaced by a touch screen with context-sensitive virtual buttons that change with the state of the e-mail notification device 220.

As illustrated in FIG. 3, the exemplary e-mail notification device includes 8 buttons for requesting that the following actions be performed: Display Menu, Select, Delete, Show Time, Re-Sync, Alter Contrast, Move Cursor Up, and Move Cursor Down. Having selected the "Menu" button, a menu is displayed. In one embodiment the menu is a text list (e.g., scrollable or fixed) of available options that can be navigated using the cursor keys. In an alternate embodiment, the menu displays text or icons representing the buttons and their new functionality based on the state of the notification device 220.

The select function can perform either or both of (1) selecting a previously unselected entry or (2) accepting that a function be performed on a presently selected entry. The Delete function discards a message that is stored on the e-mail notification device 220. The Time function toggles whether the display shows a general date that a message was received (e.g., today, yesterday, or 3 days ago) or a specific time (e.g., Feb. 22, 2000: 10:15 am).

The re-sync function triggers the notification device 220 to enter an "always listening" mode for a hardware or software configurable set of time. As explained in greater detail below, this ensures that the notification device 220 is not in a power saving mode when the transmitter 200 transmits to the notification device 220.

The Alter Contrast function allows the contrast of the screen of the e-mail notification device 220 to be altered in conjunction with the Up and Down arrow keys.

The Up and Down arrow keys allow various messages and/or options to be selected from a scrolling list on the screen. If a desired message has be reached using the Up and Down arrow keys. it can be deleted using the delete function or opened for reading using the select key.

Figure 2:
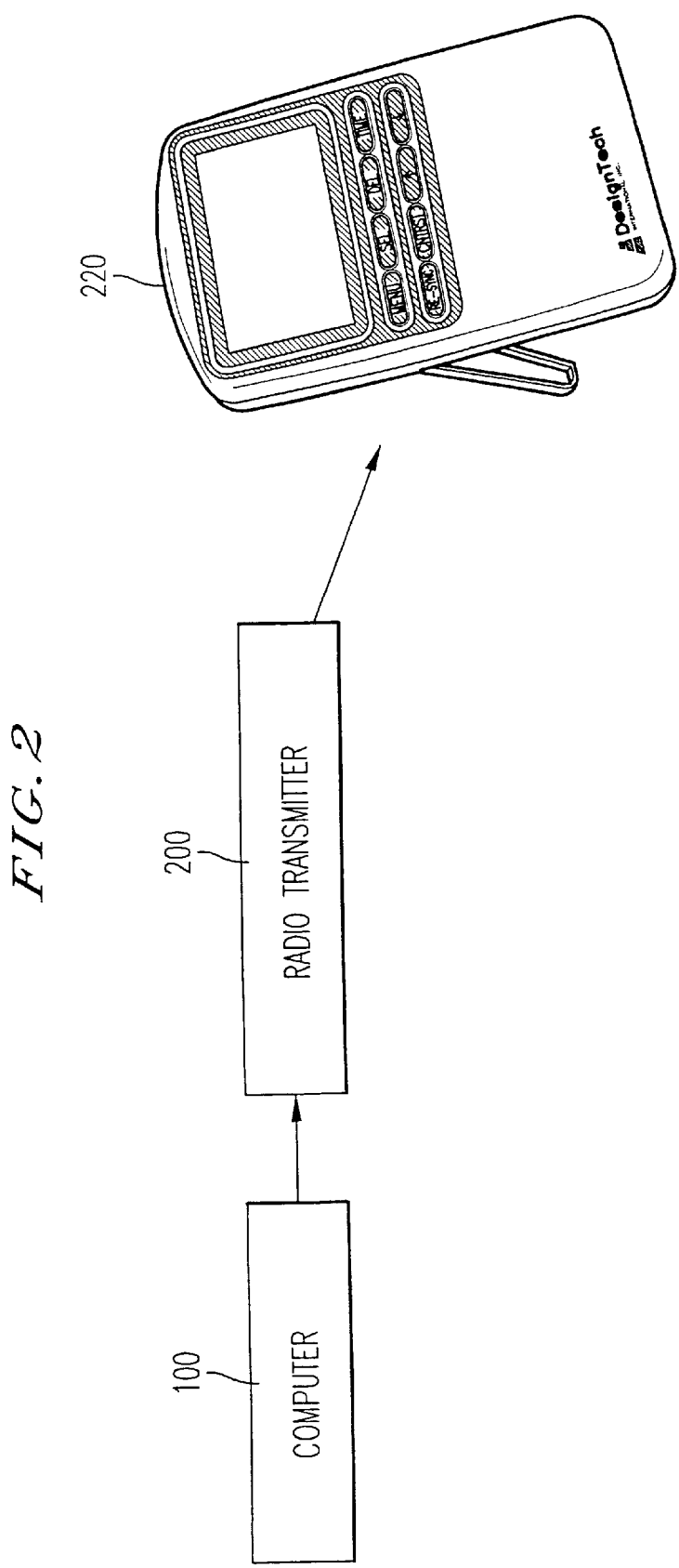
FIG. 2 is a block diagram of how e-mail messages are forwarded from the computer of FIG. 1 to the e-mail notification device.

Using the system of FIG. 2, a user of an e-mail notification device 220 can check e-mails without having to go to his or her computer. For example, when a user comes home from work and walks through the kitchen, the user can glance at the e-mail notification device 220 that would show the headers for the last un-read e-mails that are waiting for the user.

In an environment in which multiple users utilize the same computer 100 or a single user has multiple e-mail accounts, the computer 100 is configured to correlate e-mail accounts to e-mail notification devices 220. In this fashion, the headers are forwarded to the correct recipient and are not disseminated to extraneous recipients.

In an alternate embodiment, the e-mail notification device 220 is configured to interact with additional programs (e.g., calendar programs) that are run on the computer 100. Accordingly, any "alarm" set in the calendar program of the computer 100 (or sent via e-mail from a remote computer 100') can be forwarded to the computer code device that controls the transmitter 200, thereby sending the user a reminder about an event. In order to more easily integrate third-party programs into the computer code devices of the present invention, one embodiment of the present invention includes one or more tags to be added to e-mail messages such that the computer code devices can interpret how to process the message. For example, by defining a new content-type according to Multi-purpose Internet Mail Extensions, as defined in RFCs 2045 and 2046 (incorporated herein by reference), the computer code devices of the present invention can parse a message into parts and process those parts individually. Accordingly, a third-party program that wants to have a bitmap sent to a notification device 220 passes an e-mail to the computer 100 that includes a bitmap and an indication that the bitmap is part of a notification device message. The computer 100 would then parse the bit-map from the rest of the multi-part message after having parsed the content-identifier indicating that the message is a notification device message. The computer code device would then send the bit-map to the notification device 220 with or without the header and with or instead of a text message.

Just as a bitmap can be identified and parsed from a message, so too can other multi-media formats. For example, a voice message (e.g., stored in a .wav or .mp3 format) can be included in a message to the notification device 220. The notification device would then either play the message automatically or upon being selected like a text message.

In an alternate embodiment, not all messages and alarms are sent immediately to the user. As "junk" e-mail proliferates, an e-mail notification device 220 can quickly become inundated with e-mail that is of little or no interest to the user. As a result, the user may establish a set of rules that determines what messages are to be forwarded and what messages are to be blocked. Rules can use any field in the information to determine if the information should be forwarded or blocked. For example, a rule could establish that messages having "CompanyXYZ" in the "From:" field are to be forwarded. Likewise, a rule could establish that messages are never forwarded if the body of the message contains the phrase "Get rich quick."

In an alternate embodiment of the present invention, the types of messages to be received are expanded to include "chat" messages. A communication category called Instant Messaging (pioneered by ICQ and now owned by AOL) enables users to know if people in the users' Messaging Groups are logged in for "chat" communication. Accordingly, the e-mail notification device 220 can also display an up-to-date list of people who are ready for "chatting." Depending on the bandwidth of the non-commercial network and the processing power of the notification device 220, the notification device 220 may also receive real-time (or near real-time) text and/or graphics from an on-going chat session.

Although the computer 100 and the transmitter 200 are illustrated in FIG. 2 as being separate elements, an alternate embodiment, called an "integrated transmitter" integrates both of those components into a single device. The "integrated transmitter" periodically connects to an Internet service provider (e.g., by seizing a phone line and creating a dial-up connection) and polls a remote information server to determine if new information (e.g., e-mails, chat lists or web pages) are available. If so, information or the headers for that information are downloaded to the "integrated transmitter" and transmitted to the notification device 220 for viewing by the user.

The notification device 220 may be either powered by any one or a combination of: battery/batteries (for ease of transportation), a transformer, or AC current. In order to conserve power in the battery-based notification device 220, the transmitter 200 sends out periodic (e.g., once a minute) synchronization messages that include a time of when the next transmission will be. Accordingly, the notification device 220 can power down the RF receiving circuitry therein until that time. To prevent missing the next transmission due to different clock rates, the notification device 220 powers back up the RF circuitry a short time (e.g., a few tens of milliseconds) before the next transmission is scheduled to occur. If a transmission is not received within a short time (e.g.. a few tens of milliseconds) after the next transmission was to have occurred, the notification device 220 assumes that it missed the transmission and puts the RF receiving circuitry back to sleep until shortly before a subsequent periodic transmission. Before this subsequent periodic transmission, though, the notification device 220 wakes up earlier. As an increasing number of transmissions are missed, the notification device 220 wakes up increasingly early and stays on increasingly late after the scheduled time. After a further configurable number of missed transmissions, the notification device 220 remains on continuously, listening for transmissions, and eventually shuts down the transmitter completely after a time-out period (e.g., 5 minutes). The notification device 220 is then reset to "always on" listening mode by operation of a manual button (e.g., an on-off button or a "re-sync" button, described above).

By way of example, at time t=0, the transmitter 200 sends a synchronization message to the notification device 220, and in that message the transmitter 200 indicates that the next synchronization message will be sent in one minute. Accordingly, the notification device 220 places the RF receiving circuitry in sleep mode for 0.96 minutes and then wakes up the RF receiving circuitry at time t=0.96 min. The RF receiving circuitry is kept active until t=1.04, at which point it is powered down because no synchronization message was received. The RF receiving circuitry is then reawakened at time t=1.94 min, and the RF receiving circuitry is kept active until t=2.06. The RF receiving circuitry is then reawakened at time t=2.92 min. If the RF receiving circuitry has not received a message by t=3.08, the RF receiving circuitry is left in "always on" mode for an additional five minutes. After not receiving any transmission by t=8.08, the RF receiving circuitry of the notification device 220 is powered down until reset.

In order to minimize the number of transmitters that "collide" when sending, in a preferred embodiment a configurable delay as compared to a base time is used to vary when synchronization messages are sent. For example, if the base time is one minute, some transmitters are programmed with a −0.01 minute delay and others with a 0.01 minute delay such that messages are sent every 0.99 min and 1.01 minutes, respectively. Thus, even if those two transmitters collided on the first transmission, they would be 0.02 minutes apart on their next transmission.

As would be evident, because the RF receiving circuitry can be powered down when the computer 100 is ready to send a message, the computer 100 may need to wait to send a message. The computer waits until the transmitter indicates (e.g., on a busy line of a parallel port connection to the transmitter 200) that the time for a next transmission has occurred. The information is then transmitted along with an indication of when the next message (synchronization or text/graphics) will be sent.

As would be appreciated by one of ordinary skill in the art from this specification, other battery-based remote transmitter/receiver pairs can benefit from the synchronization technique described above. One such pair is an indoor/outdoor temperature sensing device system in which a transmitter periodically sends an outside temperature to a temperature receiver (similar to the notification device 220), and the temperature receiver sleeps between receiving temperature messages.

In an embodiment in which two-way communication is to be used, the private, non-commercial network can be used for communication between the computer 100 and the notification device 220 in both directions. In that embodiment, e-mail replies can be sent to the computer 100 which then forwards the reply to the remote server.

Many smart home systems utilize (or will soon utilize) power line carrier communication (e.g., X-10) or Blue-tooth communication which allow control of appliances (e.g., lamps) throughout the home through the home wiring and via radio signals. In an alternative embodiment, the system of the present invention sends message headers or messages from the transmitter 200 to an appliance receiver. The appliance receiver then interprets the messages or headers to be commands to control lights and appliances in the home. More specifically, a user at the office can send an e-mail to his home e-mail account with a command to turn ON a specified lamp or other appliance. The computer would recognize such a new e-mail with such a command in the subject header and send the appropriate command (potentially translated) to an X-10 transmitter that applies the necessary X-10 signals on the home wiring. Similarly, a Blue-tooth type translator and transmitter could send the commands via radio frequency to an appliance to respond according to the command.

As the smart home category grows, more and more appliances and sensors will have the capability to communicate back to another device. The system of the present invention may advantageously utilize two way communication (e.g., using RF, IR, X-10 or Blue-tooth type protocols). An interface to the home wiring or an interface looking at a certain radio signal system could determine that something has happened (i.e. a door open) and translate this into a signal that the receiver (which would be plugged into the computer's port) would translate into an e-mail message that could be sent to any pre-determined address—notifying the recipient of the action that occurred at the home.

Obviously, numerous additional modifications and variations of the present invention are possible in light of the above teachings. It is therefore to be understood that within the scope of the appended claims, the present invention may be practiced otherwise than as specifically described herein.

DEPOSIT OF COMPUTER PROGRAM
LISTINGS

Not applicable

What is claimed is:

1. A computer program product comprising:
 a computer storage medium and a computer program code mechanism embedded in the computer storage medium for causing a computer to forward a portion of a message to a wireless notification device using a private, non-commercial network, the computer program code mechanism comprising:
 a first computer code device configured to periodically connect the computer, using a first communications interface of the computer, to a remote information server to poll for new messages;

a second computer code device configured to download a portion of the new messages using the first communications interface of the computer; and a third computer code device configured to wirelessly transmit, using a private, non-commercial network transmitter, for a subset of the new messages, the portion of the subset of messages downloaded by the second computer code device, wherein the private, non-commercial network transmitter is connected to a second communications interface of the computer.

2. The computer program product as claimed in claim 1, wherein the first computer code device comprises a fourth computer code device configured to connect to a remote e-mail server, wherein the message is an e-mail message.

3. The computer program product as claimed in claim 2, wherein the second computer code device comprises a fifth computer code device configured to download the e-mail message in its entirety.

4. The computer program product as claimed in 2, wherein the second computer code device comprises a fifth computer code device configured to download a "From:" field and a "Subject:" field of the e-mail message.

5. The computer program product as claimed in 2, wherein the second computer code device comprises a fifth computer code device configured to download a header of the e-mail message.

6. The computer program product as claimed in 1, wherein the first computer code device comprises a fourth computer code device configured to connect to a remote hypertext transfer protocol (HTTP) server, wherein the message is a dynamically updated web-page.

7. The computer program product as claimed in 2, wherein the third computer code device comprises a fifth computer code device configured to select the subset using at least one of a "From:" field and a "Subject:" field of the e-mail message.

8. The computer program product as claimed in 2, wherein the third computer code device comprises a fifth computer code device configured to select all e-mail messages as belonging to the subset.

9. The computer program product as claimed in 1, wherein the third computer code device comprises a fourth computer code device configured to transmit the portion of the subset of messages using at least one of a parallel port, a serial port, a PS/2 port, a USB port, an audio output port, and an infrared link.

10. The computer program product as claimed in 1, wherein the third computer code device comprises a fourth computer code configured to transmit the portion of the subset of messages using a wireless radio frequency.

11. The computer program product as claimed in 1, wherein the third computer code device comprises a fourth computer code configured to transmit the portion of the subset of messages using at least one of an X-10 transmitter and a Bluetooth transmitter.

12. The computer program product as claimed in 1, wherein the first computer code device further comprises a fourth computer code configured to transmit at least one of calendar events, weather info, stock quotes, and sports results.

13. The computer program product as claimed in 1, wherein the first computer code device comprises a fourth computer code device configured to connect to a remote instant messaging server, wherein the message is a list of people available for participating in computer-based "chat" conversation.

* * * * *